UNITED STATES PATENT OFFICE.

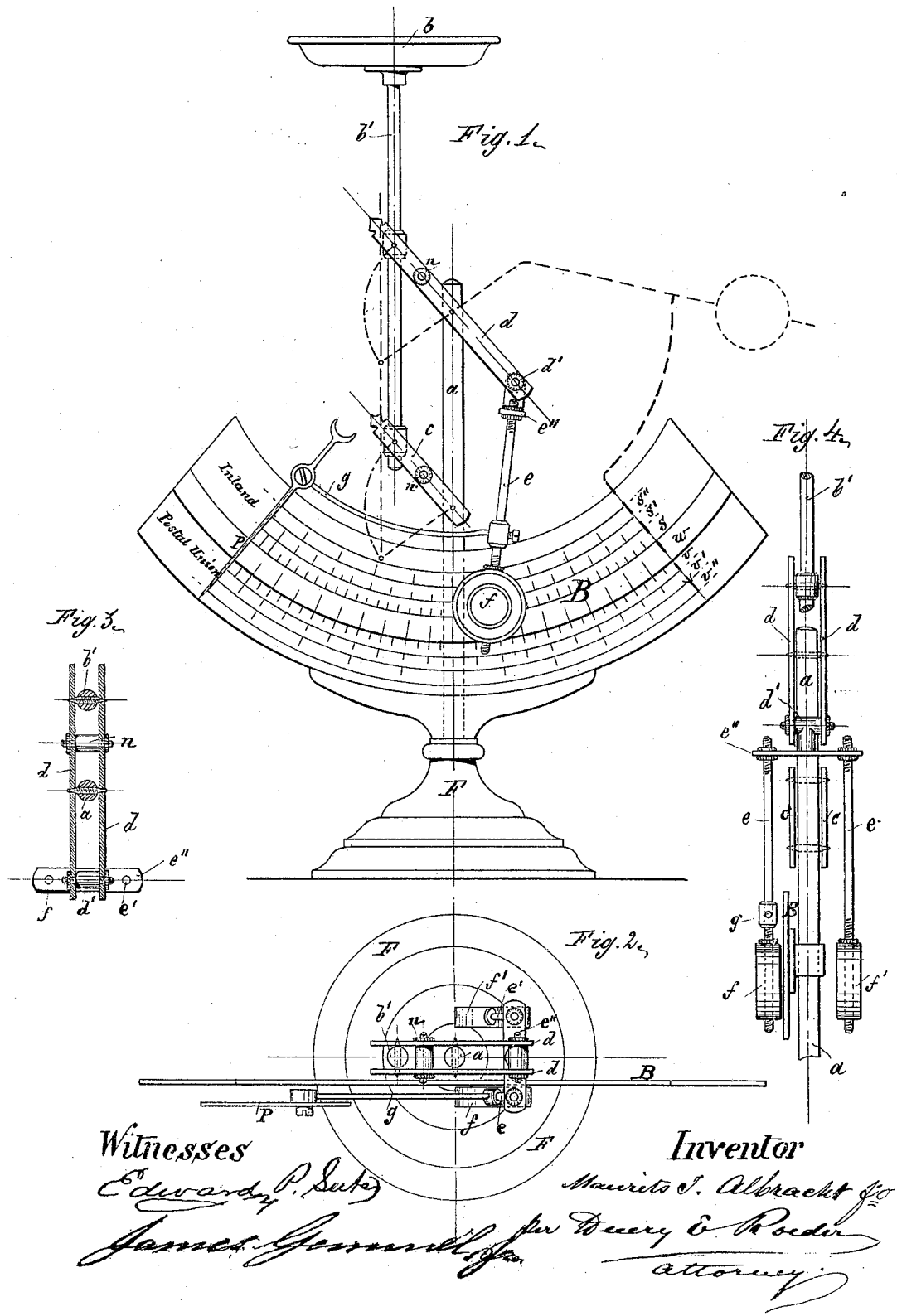

MAURITS J. ALBRACHT, JR., OF AMSTERDAM, NETHERLANDS.

WEIGHING-SCALES FOR MAIL-MATTER.

SPECIFICATION forming part of Letters Patent No. 250,413, dated December 6, 1881.

Application filed July 7, 1880. Renewed July 25, 1881. (No model.) Patented in France May 1, 1880, in Germany May 3, 1880, in Great Britain and Ireland May 24, 1880, in Austria May 28, 1880, and in Belgium May 31, 1880.

*To all whom it may concern:*

Be it known that I, MAURITS J. ALBRACHT, Jr., of Amsterdam, in the Kingdom of the Netherlands, have invented a new and useful Improvement in Scales, of which the following is a specification.

The nature of my invention consists of a balance-scale with a counter-weight, and arranged to indicate the weight of letters and post-packets for inland, as well as the postage of letters, patterns, printings, and book post-papers in accordance with the tariff of the International Post Union, by means of a particular arrangement of the scale for every desired weight. This letter-balance forms, therefore, the combination of a post-tariff with a hand-balance. In consequence of a particular disposition of the lever arrangement and indicator-hand, the graduated arc or scale will be very convenient for the observer to read, and while the bar or post carrying the whole lever arrangement is situated in the center of the scale, the scale extends equally to the right and left hand from said bar or post.

In the accompanying drawings, Figure 1 represents a front view or elevation of my improved scale. Fig. 2 is a top view of the same. Fig. 3 is a separate top view of the lever $d$, and Fig. 4 is a side elevation with the foot or stand removed.

Similar letters represent similar parts in all the figures.

F represents the foot or stand, made of any desired shape, and supporting the central bar or post, $a$, to which the scale B and the lever arrangement are attached.

$b$ is a cup or plate attached to the rod $b'$, which forms, with the levers $d$ and $c$ and the bar $a$, a parallelogram, the fulcrums of which are fine points in the rods $b'$ and bar $a$. The levers $c$ and $d$ are double, and are connected together by means of suitable bolts and distance-pieces, $n$ $n'$, so that the position of both parts in relation to each other will remain unchangeable. These levers adjust automatically on the pointed-pin connections, so that no friction can take place against the sides of the rod $b'$ and bar $a$. The upper lever, $d$, is extended over the bar $a$, and has near its end a cross-piece, $e''$, (see Fig. 4,) attached, from which two rods, $e$ $e'$, extend downward, carrying the counter-weights $f f'$ at their extremities. One of these rods $e$ $e'$ moves at the front of the scale B and the other at the back of the same.

For the exact adjustment of the balance with the scale or index plate B, the angle formed by the double lever $d$ and rods $e$ $e'$ may be altered at the point $d'$—that is to say, the position of the counter-weights in relation to that of the remaining levers and rods may be regulated as required.

To the front counter-weight rod, $e$, an arm, $g$, is attached, for the purpose of arranging the index-scale B symmetrically to the central rod or bar, $a$. At the end of the arm $g$ the lever or pointer P is attached, situated in a radial line upon the scale B. This scale-plate B has a weight-scale, $w$, marked on its face, indicating the weights in ounces and parts of ounces. Below this there is a scale, $v$, indicating the postage of letters within the International Post Union according to the weights determined in the tariff. A similar scale, $v'$, indicates the postage for printed matter and book post-papers, and a scale, $v''$, for merchandise, &c., within the International Post Union. Above the weight-scale $w$ there are three similar scales, $s$ $s'$ $s''$, for indicating the postage of letters, printing matter, and merchandise within the Postal District of the Inland.

What I claim as my invention, and desire to secure by Letters Patent, is—

1. In combination with the parallelogram formed by the levers $d$ $c$ and rods $b'$ and $a$, and supporting the disk or plate $b$, the rods $e$ $e'$, adjustable at $d'$, the arm $g$, attached to the rod $e$, with its hand or pointer P attached thereto and placed radially on the graduated arc or scale B, and the weight $w$, arranged to operate with a graduated scale, B, substantially in the manner and for the purpose described.

2. A graduated scale situated symmetrically to both sides of the central vertical bar, $a$, and divided to indicate the postage for letters, printed matter, and merchandise within the International Postal Union, as well as for the Postal District of the Inland, in combination with a suitable hand or pointer, P, substantially in the manner and for the purpose herein set forth.

M. J. ALBRACHT, JR.

Witnesses:
L. MASCHMANN,
G. GRÜNEWALD.